(12) United States Patent
Tanaka

(10) Patent No.: US 12,244,676 B2
(45) Date of Patent: Mar. 4, 2025

(54) INFORMATION PROCESSING SYSTEM, METHOD FOR CONTROLLING THE SAME, MOBILE TERMINAL, AND METHOD FOR CONTROLLING THE SAME

(71) Applicant: CANON KABUSHIKI KAISHA, Tokyo (JP)

(72) Inventor: Jun Tanaka, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 5 days.

(21) Appl. No.: 18/312,431

(22) Filed: May 4, 2023

(65) Prior Publication Data

US 2023/0370531 A1 Nov. 16, 2023

(30) Foreign Application Priority Data

May 13, 2022 (JP) ................................ 2022-079197

(51) Int. Cl.
*H04L 67/55* (2022.01)
*H04L 9/40* (2022.01)
*H04N 1/00* (2006.01)

(52) U.S. Cl.
CPC ............ *H04L 67/55* (2022.05); *H04L 63/102* (2013.01); *H04N 1/00307* (2013.01)

(58) Field of Classification Search
CPC .... H04L 67/55; H04L 63/102; H04N 1/00307
See application file for complete search history.

(56) References Cited

U.S. PATENT DOCUMENTS

| 2008/0052710 A1* | 2/2008 | Iwai | ...................... G06F 3/1285 718/100 |
| 2016/0012465 A1* | 1/2016 | Sharp | ................... G06Q 20/321 705/14.17 |

FOREIGN PATENT DOCUMENTS

JP 2008040727 A 2/2008

\* cited by examiner

*Primary Examiner* — Dhairya A Patel
*Assistant Examiner* — Sujana Khakural
(74) *Attorney, Agent, or Firm* — Canon U.S.A., Inc. IP Division

(57) ABSTRACT

An information processing system includes a controller configured to control information of which is notified to a mobile terminal. The controller performs control to cause a notification unit to notify the mobile terminal of first information in a case where the mobile terminal in a first environment has succeeded in authentication with the first authentication method, notify the mobile terminal of the first information and second information in a case where the mobile terminal in a second environment has succeeded in the authentication with the first authentication method, and notify the mobile terminal of the first information and the second information in a case where the mobile terminal in the first environment has succeeded in the authentication with the first authentication method and has further succeeded in authentication with the second authentication method.

6 Claims, 13 Drawing Sheets

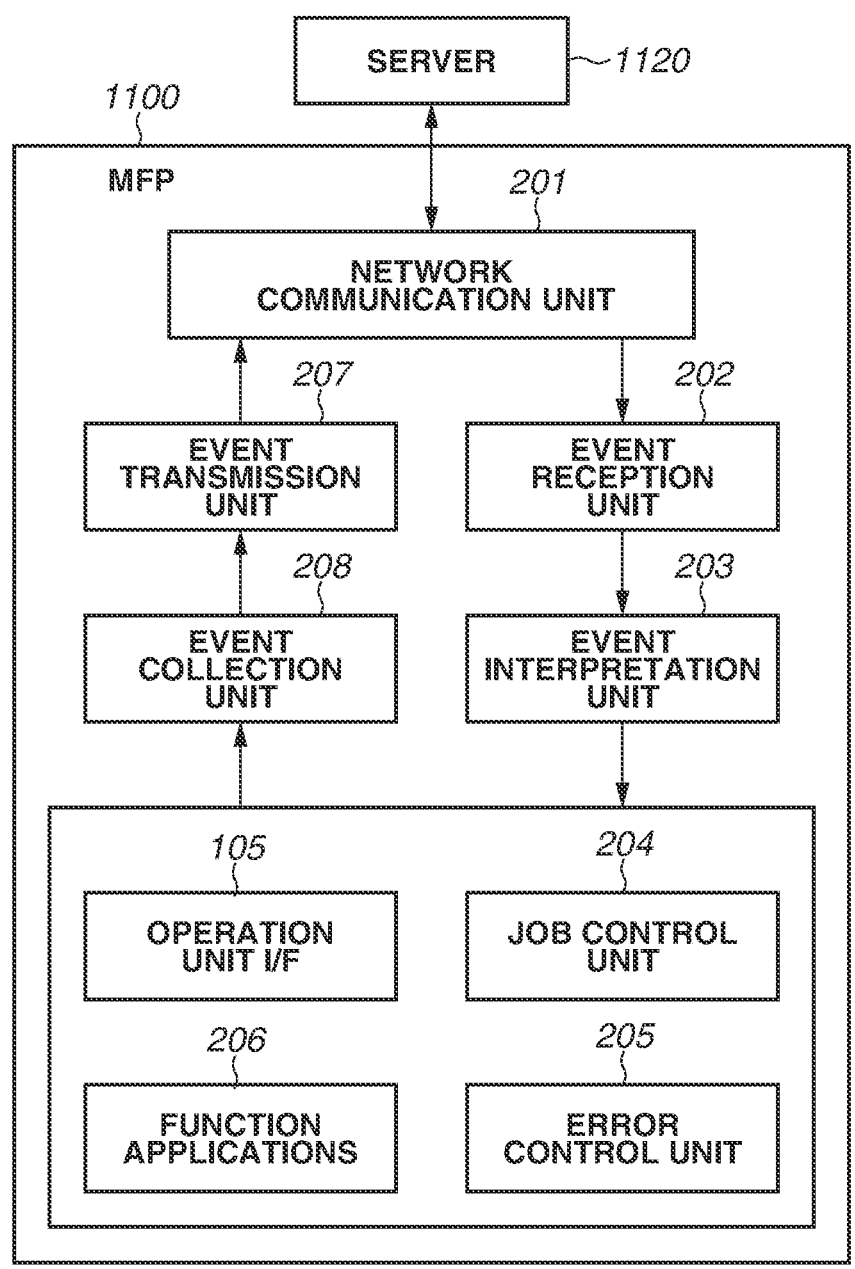

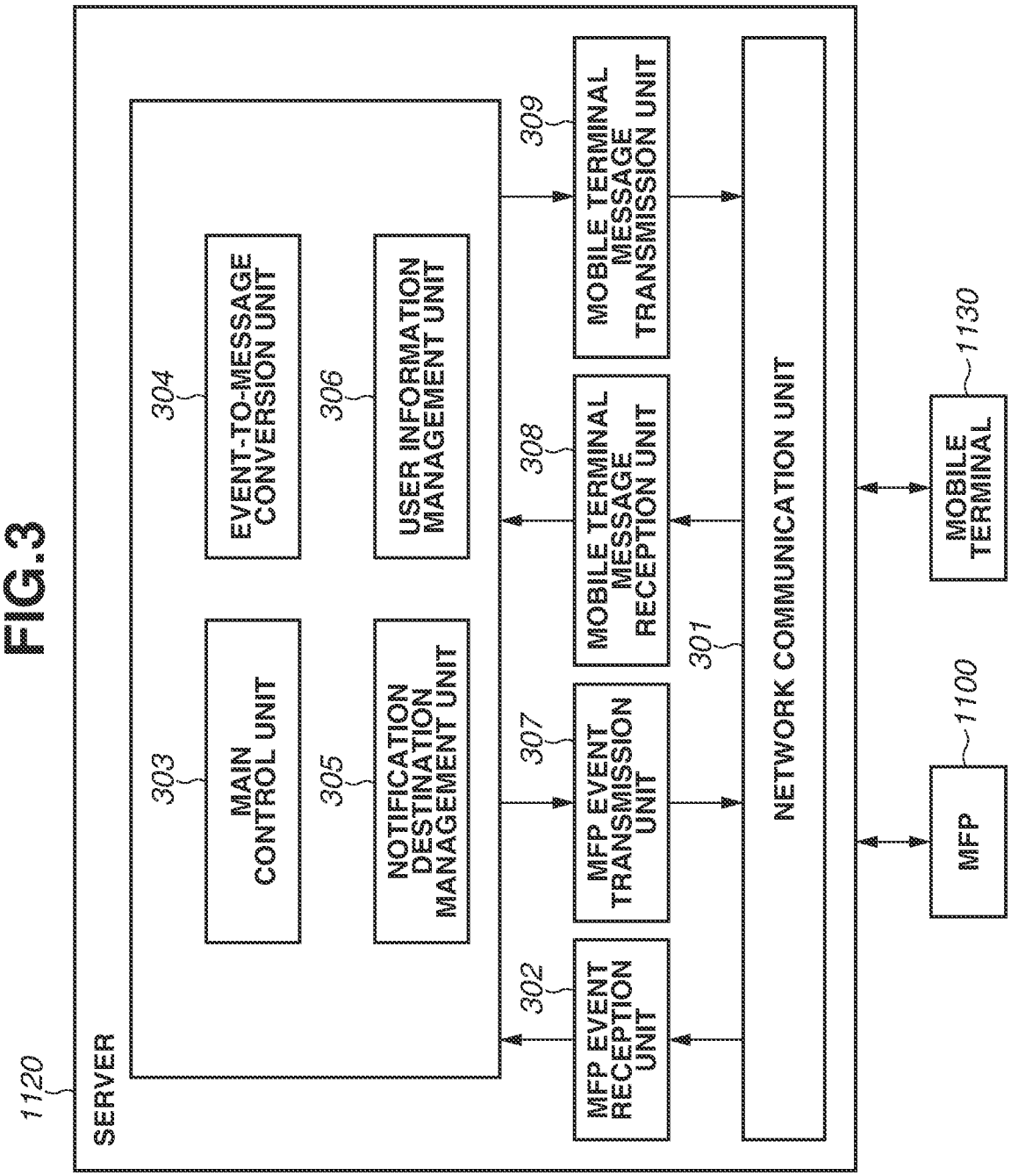

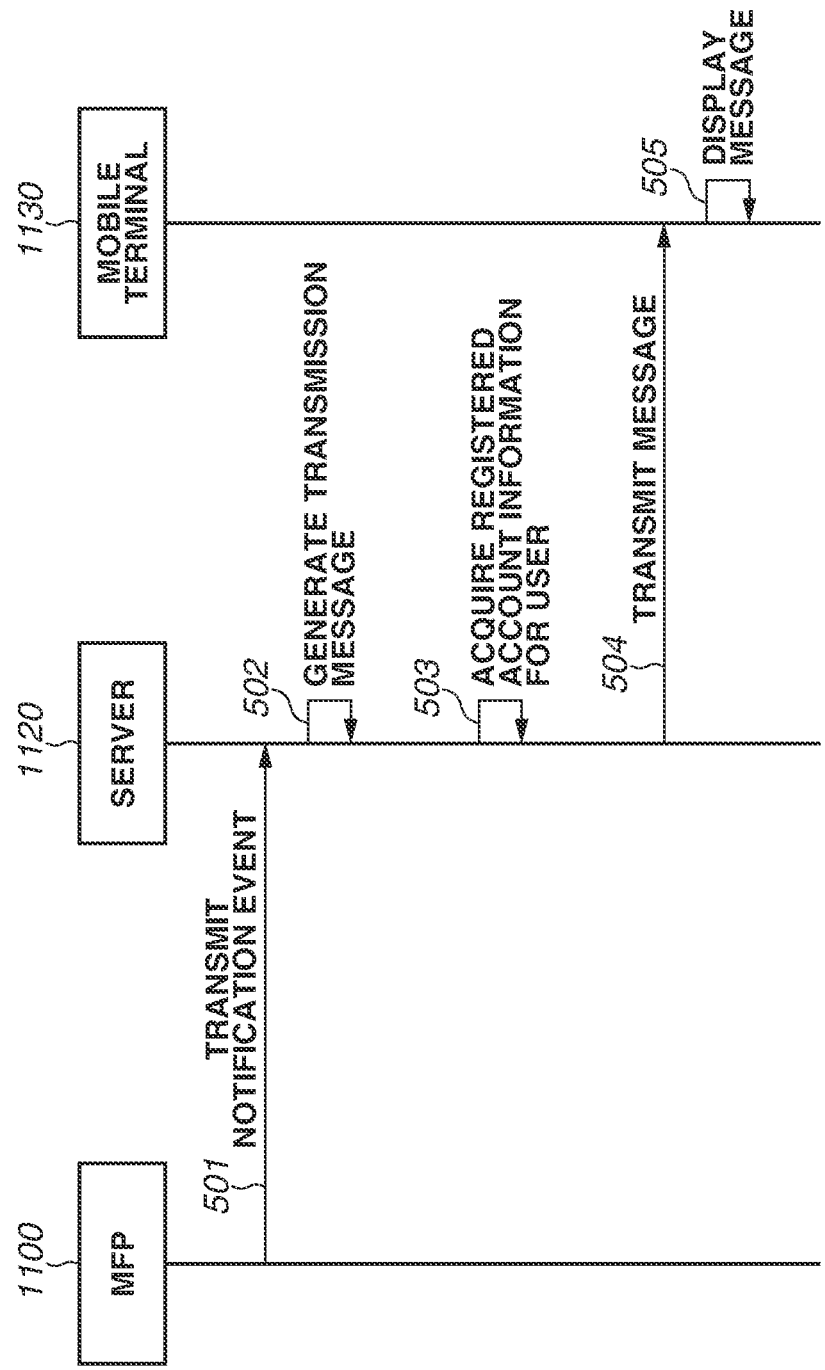

FIG.6

| ACCOUNT NAME | NAME | ACCESS LOCATION | AUTHENTICATION | SECURITY LEVEL |
|---|---|---|---|---|
| taro.shimomaruko | TARO SHIMOMARUKO | OFFICE | NORMAL LOGIN | HIGH |
| ichiro.kosugi | ICHIRO KOSUGI | OFFICE | NORMAL LOGIN | HIGH |
| kotaro.simomaru | KOTARO SIMOMARU | SATELLITE OFFICE | NORMAL LOGIN | LOW |
| hanako.kawasaki | HANAKO KAWASAKI | HOME | NORMAL LOGIN | LOW |
| saburo.toride | SABURO TORIDE | HOME | TWO-STEP AUTHENTICATION | HIGH |

| NOTIFICATION TYPE | SECURITY LEVEL | |
|---|---|---|
| | LOW | HIGH |
| CONSUMABLE WARNING | *** WILL SOON RUN OUT. | *** WILL SOON RUN OUT. |
| FAX RECEPTION | FAX HAS BEEN RECEIVED. | FAX HAS BEEN RECEIVED. SENDER: 000-0000-0000 (***, CO., LTD.) |
| FILE TRANSMISSION | FILE HAS BEEN TRANSMITTED FROM MFP. | FILE HAS BEEN TRANSMITTED FROM MFP. DESTINATION ADDRESS: *.*@xmail.com FILE: APPLICATION.pdf |
| USED AMOUNT REPORT | USED AMOUNT IN THIS MONTH HAS BEEN FIXED. | USED AMOUNT IN THIS MONTH HAS BEEN FIXED. COLOR: 520 SHEETS MONOCHROME: 1,200 SHEETS |

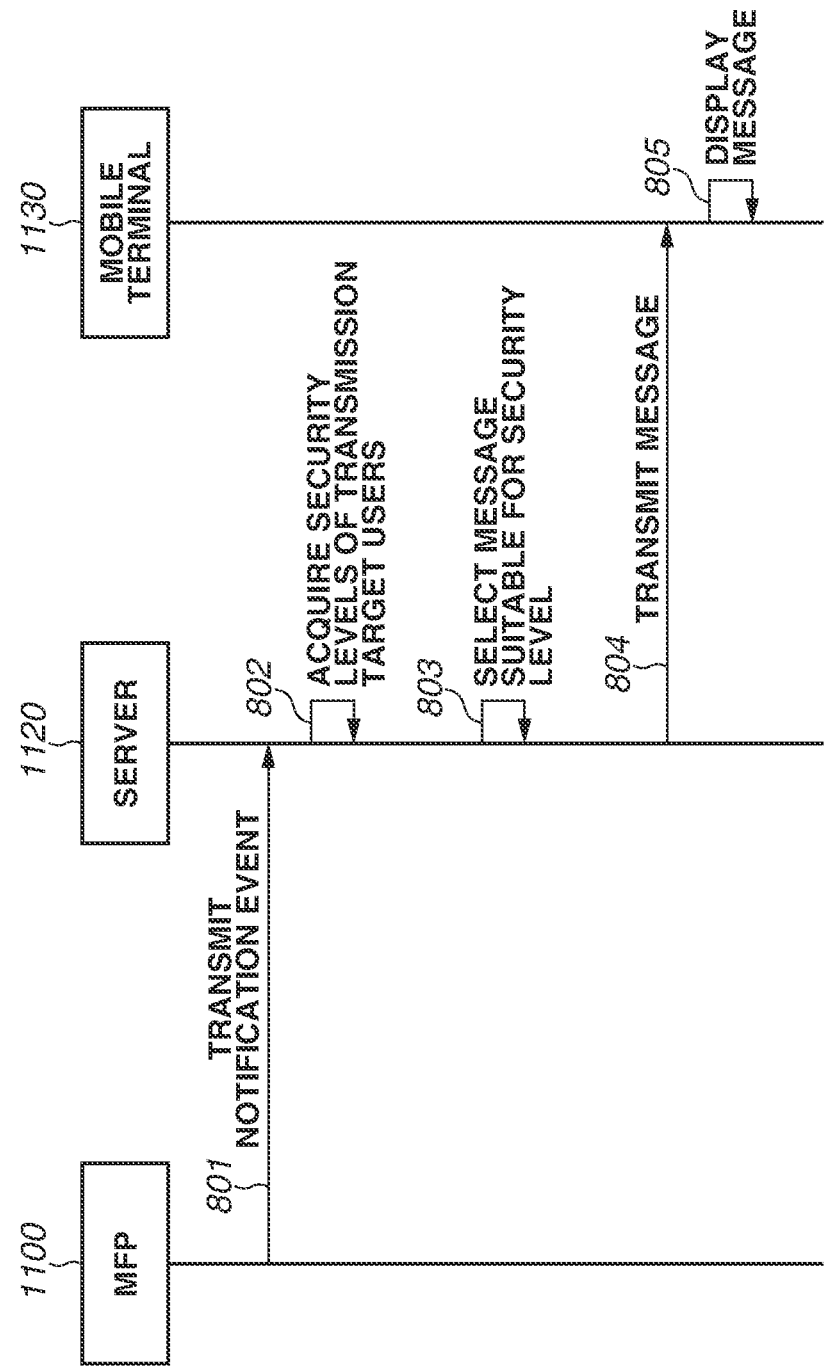

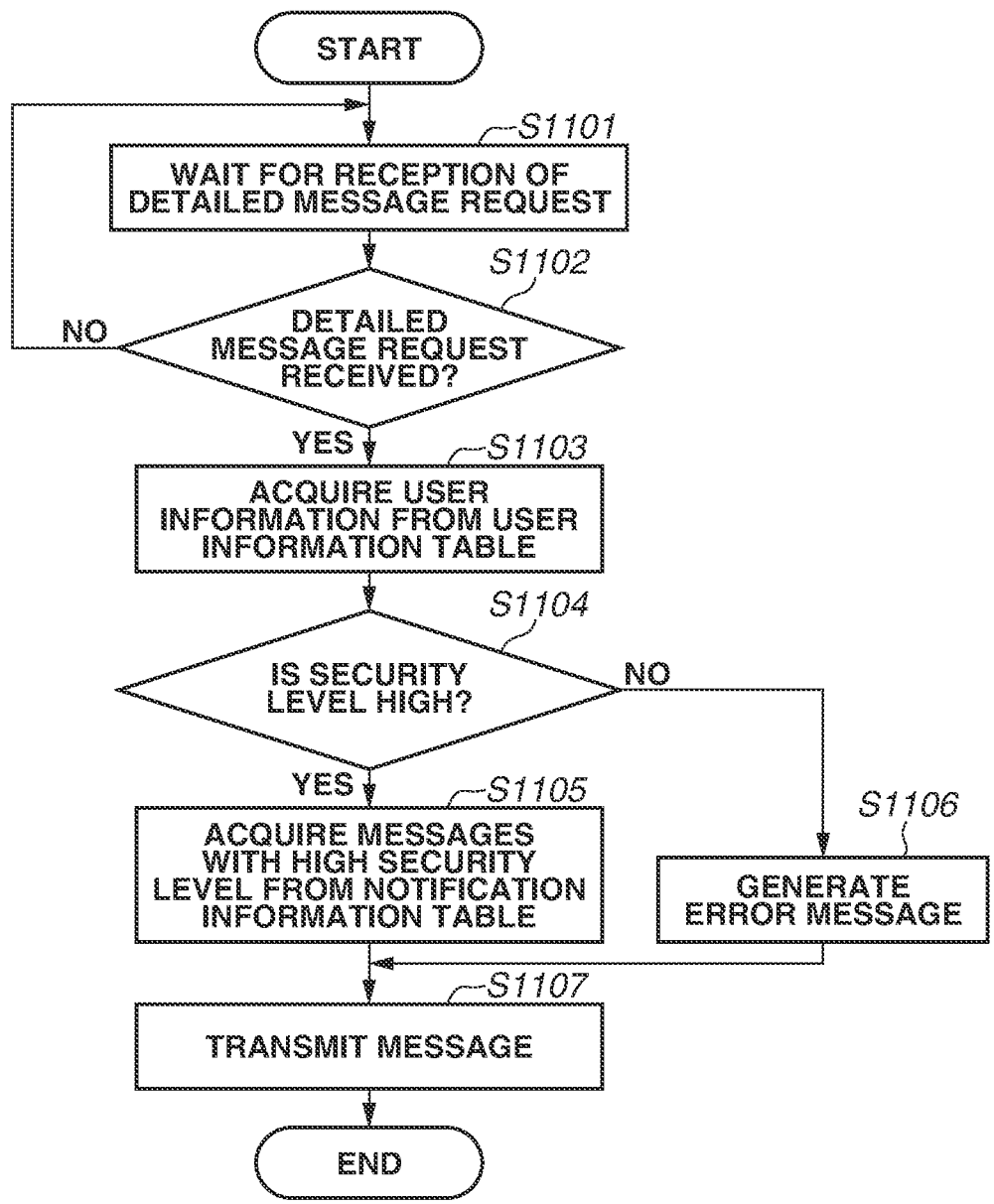

INFORMATION PROCESSING SYSTEM, METHOD FOR CONTROLLING THE SAME, MOBILE TERMINAL, AND METHOD FOR CONTROLLING THE SAME

BACKGROUND

Field

The present disclosure relates to an information processing system, a method for controlling the information processing system, a mobile terminal, and a method for controlling the mobile terminal.

Description of the Related Art

In a known system, external terminals such as mobile terminals and an information processing apparatus, such as an image forming apparatus, are connected via a chat application and a management application. Such a system enables users' mobile terminals to be notified of an event that has occurred in the information processing apparatus, via the chat application. The information processing apparatus communicates with a plurality of mobile terminals via a server.

Mobile terminals connect to the server from various environments including locations with the high security level, such as offices where entry and exit are physically limited, and locations with the low security level, such as individual homes and shared spaces where terminal viewing is not physically limited. More specifically, the server notifies a plurality of mobile terminals in various connection environments of an event that has occurred in the information processing apparatus.

In such a system, in a case where the information processing apparatus issues a notification to user terminals, information may leak from details of the notification depending on the security level in the user side. For example, possible risks include peeping and surreptitious image-capturing in shared spaces. The network security of individual homes of users is not always in a desirable state. Japanese Patent Application Laid-Open No. 2008-40727 discusses a technique for changing the method for issuing a notification according to the status of an apparatus that receives the notification.

SUMMARY

According to an aspect of the present disclosure, an information processing system in which a server and a mobile terminal are communicable. The mobile terminal accepts first authentication information to be used in a first authentication method and second authentication information to be used in a second authentication method different from the first authentication method. The server includes a first reception unit configured to receive, from the mobile terminal, information about an authentication state in the information processing system and information indicating a connection environment of the mobile terminal, and a notification unit configured to notify the mobile terminal of information, and a controller having one or more processors and one or more memories, the controller configured to, in response to receiving, from the mobile terminal, the information about the authentication state in the information processing system and the information indicating the connection environment of the mobile terminal, change the information to be notified of by the notification unit based on the received information about the authentication state and the received information indicating the connection environment. The controller performs control to cause the notification unit to notify the mobile terminal of first information in a case where the mobile terminal in a first environment has succeeded in authentication with the first authentication method, notify the mobile terminal of the first information and second information in a case where the mobile terminal in a second environment has succeeded in the authentication with the first authentication method, and notify the mobile terminal of the first information and the second information in a case where the mobile terminal in the first environment has succeeded in the authentication with the first authentication method and has further succeeded in authentication with the second authentication method.

Further features of the present disclosure will become apparent from the following description of exemplary embodiments with reference to the attached drawings.

BRIEF DESCRIPTION OF THE DRAWINGS

FIG. 2 illustrates an example of a software configuration of an information processing apparatus according to the present exemplary embodiment.

FIG. 3 illustrates an example of a software configuration of a server according to the present exemplary embodiment.

FIG. 5 is an example of an overall processing sequence of the system according to the present exemplary embodiment.

FIG. 6 is an explanatory diagram illustrating an example of a user information management table according to the present exemplary embodiment.

FIG. 7 is an explanatory diagram illustrating an example of a notification message management table according to the present exemplary embodiment.

FIG. 8 illustrates an example of an overall processing sequence of the system according to the present exemplary embodiment.

FIG. 11 is a flowchart illustrating message re-acquisition processing according to the present exemplary embodiment.

DESCRIPTION OF THE EMBODIMENTS

An information processing system according to an exemplary embodiment of the present disclosure will be described below with reference to the accompanying drawings.

Figure 1A:
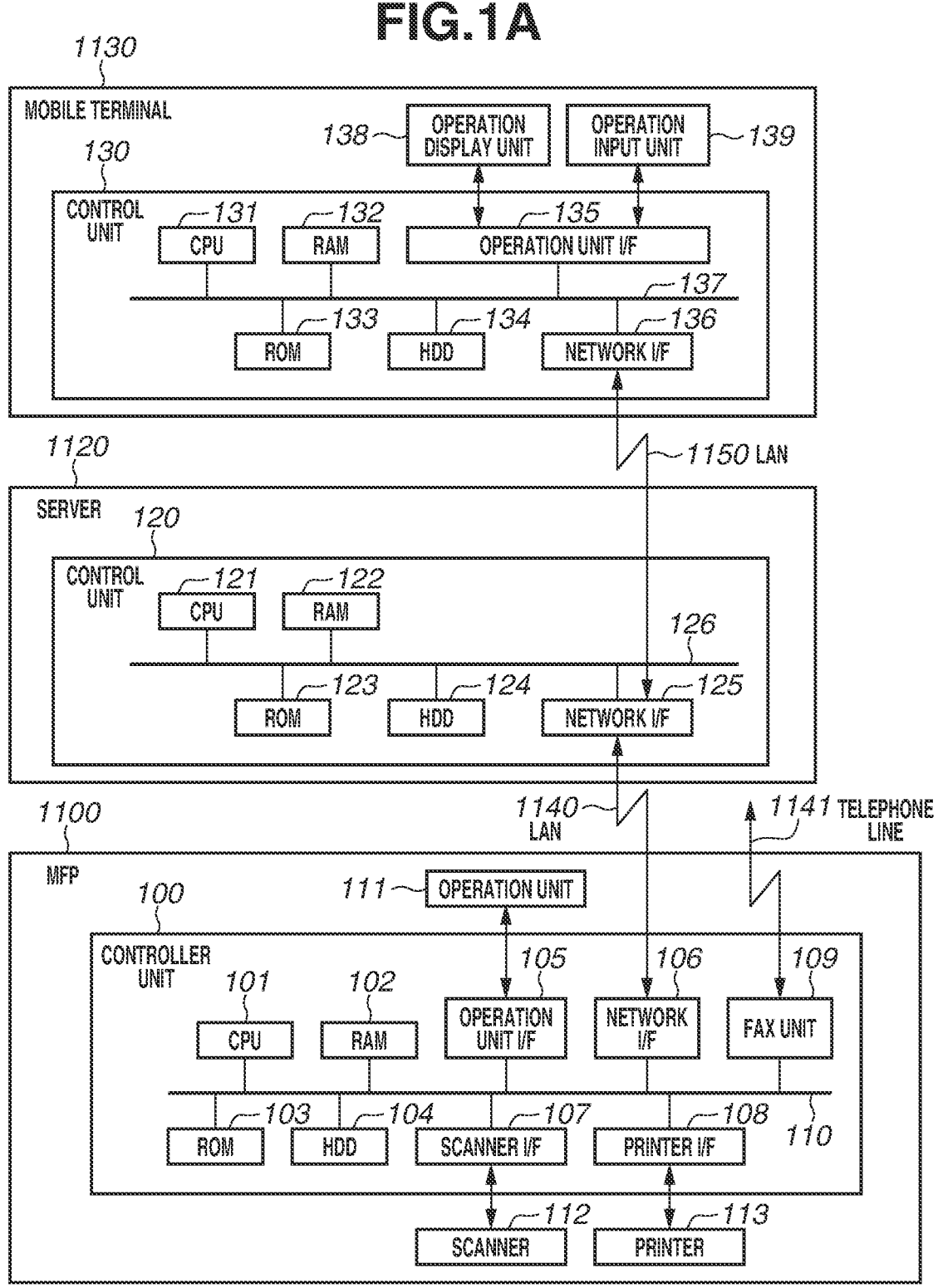
FIGS. 1A and 1B each illustrate an example of an overall configuration of a system according to an exemplary embodiment.
Figure 1B:
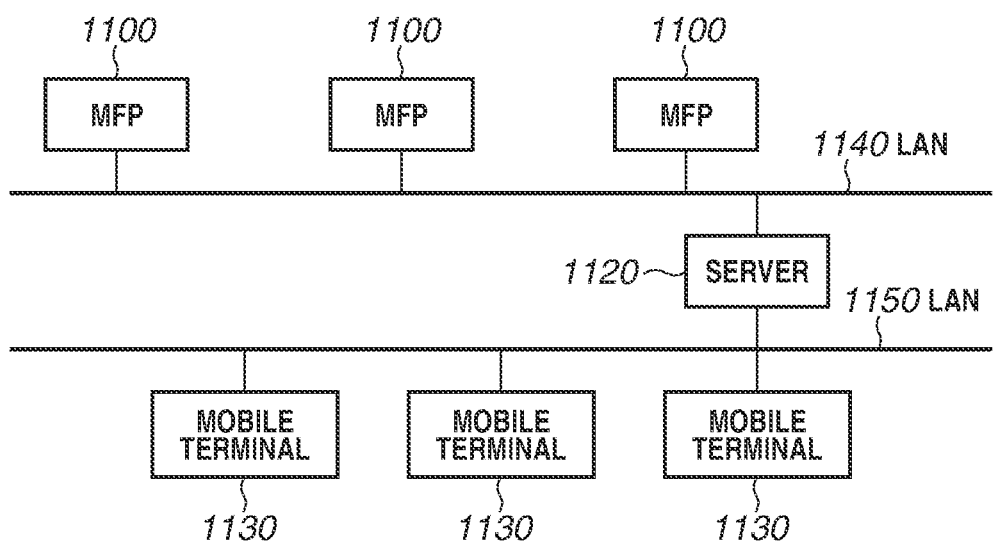

FIGS. 1A and 1B each illustrate an overall configuration of a system according to the present exemplary embodiment. In the present exemplary embodiment, a description will be provided, as an example, of a multifunctional peripheral (MFP) having the copy function and the print function which serves as an information processing apparatus.

FIG. 1B illustrates a detailed system configuration including a hardware configuration. An MFP 1100 serving as an information processing apparatus is communicably connected to a server 1120 via a network, such as a Local Area Network (LAN) 1140. The server 1120 is communicably connected to one or a plurality of mobile terminals 1130.

FIG. 1A illustrates an overall configuration of the information processing system according to the present exemplary embodiment. The server 1120 is connected to a plurality of the MFPs 1100 on the LAN 1140. The server 1120 is connected also to a plurality of the mobile terminals 1130 on the LAN 1150. A controller unit 100 includes a central processing unit (CPU) 101 that executes various control programs.

The MFP 1100 includes the controller unit 100 connected not only with a scanner 112 and a printer 113 but also with an operation unit 111 and the LAN 1140.

The CPU 101 activates the MFP 1100 based on a boot program stored in a read only memory (ROM) 103. The CPU 101 reads a control program stored in a hard disk drive (HDD) 104 and performs predetermined processing by using the RAM 102 as a work area. The HDD 104 stores various control programs for functions including copy, print, and other functions, and stores scan data read from the scanner 112. An operation unit interface (I/F) 105 controls data input and output communication with the operation unit 111. A network I/F 106 is connected to the LAN 1140 and controls input and output operations for information via the LAN 1140. A scanner I/F 107 inputs image data from the scanner 112, and inputs and outputs scanner control data. The printer I/F 108 outputs output image data to the printer 113, and inputs and outputs printer control data. A FAX unit 109 transmits and receives fax data via a telephone line 1141. The above-described devices 101 to 109 are disposed on a system bus 110.

The operation unit 111 is provided with input devices, such as a touch panel and hardware keys, and display devices, such as a liquid crystal display (LCD) and a light emitting diode (LED). The operation unit 111 is an interface for the user to input instructions and is used for displaying information to the user. The hardware keys include a start button for issuing an instruction to start scanning a paper document. The scanner 112 including an optical reading device, such as a charge coupled device (CCD) sensor, has a function of optically scanning a paper medium to read electronic image data. An automatic document feeder (ADF) has a function of automatically feeding document sheets one by one from a bundle of document paper placed on a document tray and a function of discharging read document sheets. Sensors enable a determination as to whether document sheets are placed on the document tray of the ADF. The printer 113 has a function of forming an image on a recording medium, such as paper, based on electronic image data.

The server 1120 is connected to the MFP 1100 via a network, such as the LAN 1140, and receives information, such as logs and notifications transmitted from the MFP 1100. The server 1120 includes a control unit 120 that is connectable to the LAN 1140. The control unit 120 includes a CPU 121 for executing various control programs and controls overall operations of the server 1120.

The CPU 121 reads control programs stored in the ROM 123 and/or the HDD 124 and performs predetermined processing by using the RAM 122 as a work area. The HDD 124 stores various programs including a control program for receiving instructions and notifications to the MFP 1100, and a control program for communicating messages with the mobile terminal 1130. The network I/F 125 controls input and output operations for information via the LANs 1140 and 1150.

The above-described devices 121 to 125 are disposed on a system bus 126.

A mobile terminal 1130 is connected to the server 1120 via a network, such as the LAN 1150 and receives messages transmitted from the server 1120. Each mobile terminal 1130 also transmits messages to the server. The mobile terminal 1130 includes a control unit 130 that is connectable to the LAN 1150. The control unit 130 includes a CPU 131 that executes various control programs, and controls the overall operation of the mobile terminal 1130.

The CPU 131 reads a control program stored in a ROM 133 and an HDD 134 and performs predetermined processing by using a RAM 132 as a work area. The HDD 134 receives various control programs including a control program for receiving from the server 1120 a message for displaying a notification from the MFP 1110, and displaying the message on the screen. A network I/F 136 controls input and output operations for information via the LAN 1150. The operation unit I/F 135 controls data output communication with an operation display unit 138 and input and output operations for data with respect to an operation input unit 139. The above-described devices 131 to 136 are disposed on a system bus 137.

FIG. 2 illustrates a software configuration of the information processing apparatus according to the present exemplary embodiment. FIG. 2 mainly illustrates the software configuration of the MFP 1100 serving as an information processing apparatus.

In the present specification, these software programs included in the MFP 1100 are stored in one of the RAM 102, the ROM 103, and the HDD 104 and executed by the CPU 101. In the MFP 1100, software for implementing scanning, printing, and other various functions using a network and a storage device run.

The operation unit I/F 105 has a function of displaying a screen to be operated by the user on the operation unit 111 and a function of transferring a user operation to another software. The operation unit I/F 105 mainly controls operations on the hardware components of the operation unit 111 and the display thereon. Function applications 206 are software programs for activating the copy, print, mail transmission, and other functions. A plurality of the function applications 206 is provided for different functions. Each of the function applications 206 operates when triggered by an instruction from the user via the operation unit 111 and data reception via a network such as the LAN 1130. When a job control unit 204 receives a job execution instruction from each function application 206, the job control unit 204 controls the scanner 112 and the printer 113 via the scanner I/F 107 and the printer I/F 108 to perform scanning and printing, respectively. An error control unit 205 receives notifications of anomalies that have occurred mainly in the job control unit 204, the printer 113, and/or the scanner 112, and performs control to halt the entire system and issue a degeneracy operation instruction.

A network communication unit 201 communicates information with the server 1120 via a network, such as the LAN 1140. In response to the network communication unit 201 receiving a notification of an event from the server 1120, an event interpretation unit 203 interprets the event as a device control instruction. The event interpretation unit 203 issues an execution instruction to each function application 206 according to the interpreted instruction.

An event collection unit 208 receives a notification of an event from the function applications 206, selectively adds event information, arranges data, and stores the data as notification event data.

The event collection unit 208 receives warnings and control information from the job control unit 204 and/or the error control unit 205 and similarly arranges data. The stored notification event data is transmitted to the server 1120 via the network communication unit 201 by an event transmission unit 207.

FIG. 3 illustrates a software configuration of the server 1120 according to the present exemplary embodiment.

According to the present specification, these software programs included in the server 1120 are stored in one of the RAM 122, the ROM 123, and the HDD 124 and executed by the CPU 121.

A network communication unit 301 communicates information with the MFP 1100 via a network, such as the LAN 1140. The network communication unit 301 communicates information with the mobile terminal 1130 via a network, such as the LAN 1150. An MFP event reception unit 302 receives data of notification event from the MFP 1110 via the network communication unit 301. A main control unit 303 converts the received data of notification event into a message to be transmitted to the mobile terminal 1130. The conversion from a notification event to a message is performed according to information stored in an event-to-message conversion unit 304. A notification destination management unit 305 stores account information for the mobile terminal 1130 to which a message is to be transmitted. The main control unit 303 issues a message transmission instruction to the mobile terminal 1130 according to the account information stored in the notification destination management unit 305.

In response to a mobile terminal message transmission unit 309 receiving the message transmission instruction from the main control unit 303, the mobile terminal message transmission unit 309 transmits a message to the mobile terminal 1130 via the network communication unit 301. A mobile terminal message reception unit 308 receives the message from the mobile terminal 1130 via the network communication unit 301. The main control unit 303 converts the received message into a notification event based on the information stored in the event-to-message conversion unit 304. The notification event resulting from the conversion is supplied with the account information for the mobile terminal 1130 that has transmitted a message stored in a user information management unit 306. The notification event is transmitted to the MFP 1110 via the network communication unit 301 by an MFP event transmission unit 307.

Figure 4:
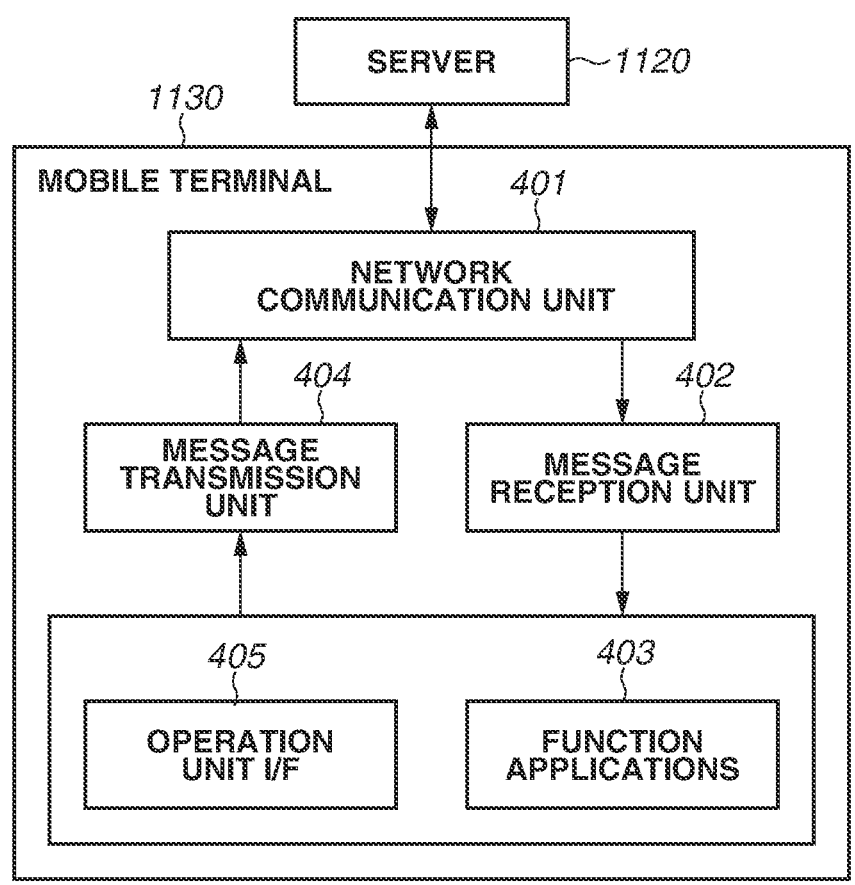
FIG. 4 illustrates an example of a software configuration of a mobile terminal according to the present exemplary embodiment.

FIG. 4 illustrates a software configuration of the mobile terminal 1130 according to the present exemplary embodiment.

According to the present specification, these software programs included in the mobile terminal 1130 are stored in one of the RAM 132, the ROM 133, and the HDD 134 and executed by the CPU 131.

A network communication unit 401 communicates information with the server 1120 via a network, such as the LAN 1140. A message reception unit 402 receives a message from the server 1120 via the network communication unit 401. The received message is used by the corresponding function application 403. Function applications 403 are software programs for activating various functions of the mobile terminal 1130. A plurality of the function applications 403 is provided for different functions. For example, the function application 403 for notifying the user of a received message displays the received message on the operation display unit 138 via an operation unit I/F 405. A message transmission unit 404 transmits a message generated by the respective function application 403 to the server 1120 via the network communication unit 401.

FIG. 5 illustrates an example sequence in a conventional system without the functions of the present exemplary embodiment. The mobile terminal 1130 communicates messages with the server 1120 via an application program or the like. The user who wants to receive information for the MFP 1100 firstly activates the application program and then inputs authentication information to be authenticated. The authentication information may be configured such that the mobile terminal 1130 accepts an input of a character string and fingerprint information from the user and transmits the accepted authentication information to an authentication server (not illustrated), and the authentication server performs the authentication. The mobile terminal 1130 having been successfully authenticated is enabled to communicate messages with the server 1120.

The MFP 1110 initially generates data of a notification event based on an event that has occurred therein, then in step 501, the MFP 1110 transmits the notification event to the server 1120. In response to the server 1120 receiving the notification event, then in step 502, the main control unit 303 generates a transmission message. In step 503, the main control unit 303 acquires the account information for the user, registered in the notification destination management unit 305. In step 504, the main control unit 303 transmits a message to the mobile terminal 1130 for the acquired account. In response to the mobile terminal 1130 receiving the message, the mobile terminal 1130 displays the message on the operation display unit 138 in step 505.

The message transmission to the mobile terminal 1130 according to the present exemplary embodiment will now be described below.

FIG. 6 illustrates an example of a management table which is stored in the user information management unit 306. The management table manages the account information for which message communication with the server 1120 is allowed. A user information management table 601 includes information about account names, user names, access locations, and authentication states.

The user information management unit 306 search for an account and extracts information based on the information in the management table 601. The account information is preregistered by a management user, and only the registered users are allowed to access the server 1120.

The user information management unit 306 determines the security level based on the access location and the authentication information according to preregistered conditions. Conditions that are to be considered high security level are preregistered as criteria for determining the security level. Access location information associated with the account is acquired and then received as a message by the function application 403 of the mobile terminal 1130. In response to the server 1120 receiving a message, the server 1120 updates the location information for the account. In a case where the server 1120 receives an account logout, the server 1120 sets an unknown location. The method for acquiring the notification access location is not limited and can also be implemented by directly acquiring network information that is used with the mobile terminal 1130, and/or global positioning system (GPS) positional information and the like for the mobile terminal 1130.

The user information management unit 306 determines, for example, the connection environment (access environment), such as "Office", "Satellite", and "Home" according to the preregistered condition based on the Internet Protocol (IP) address and the positional information.

In this case, for example, the user information management unit 306 determines the access location from the following: "office" where the security level is enhanced by a firewall, "home" with an external network without a firewall, or "satellite" where the unspecified number of persons are present. If the user does not access or if the location information cannot be acquired, the access location is treated as an unknown location. Although, in the present exemplary embodiment, an unknown location is treated as an environment with the low security level, the message transmission may be prevented.

The authentication state information associated with the account is registered based on a message of the function application 403 that uses the login function. The user performs a login operation on the application program, so that the mobile terminal 1130 transmits a message. In response to the server 1120 receiving the message, the server 1120 updates the authentication information for the corresponding account according to the details of the message. In a case where the user performs a logout operation, the mobile terminal 1130 similarly transmits a message, and the server 1120 sets the authentication information to logout. In the authentication, the account name and the password are transmitted to the authentication server as a message, and if the transmitted account name and password coincide with the registered ones, the authentication is regarded as being successful and registered as normal authentication. In a case where biological information, such as a fingerprint acquired from the operation unit I/F 405, coincides with the registered one, a successful two-step authentication is registered.

While a description has been provided of the authentication method described above in the present exemplary embodiment, the method is not limited thereto, and other methods are also applicable. The acquisition of the authentication information is implementable with the two-element authentication using other authentication methods based on a knowledge element, a possession element, and a living body element. The acquisition of the authentication information can also be implemented with the two-step authentication using two different types of authentication with the same element. More specifically, the user may log into the application program by performing two different authentications: authentication using first user information and another authentication using second user information different from the first user information. When the user logs out, the user is regarded as being in a logout state.

FIG. 7 is an explanatory diagram illustrates an example of a table for managing messages to be transmitted to the mobile terminal 1130 corresponding to notifications from the MFP 1110. The managing messages are stored in the event-to-message conversion unit 304. In a notification information table 701, notification types are in association with the corresponding messages for each security level. For example, for the low security level, a job situation and/or the status information for the MFP 1110 are included as the first information. For the high security level, information about the FAX sender who is the job executor, the file transmission destination, the transmitted file information, and detailed status information are included in addition to the first information. The event-to-message conversion unit 304 converts a notification into a message based on the table 701. Examples of notification types include a job situation, such as FAX reception and file transmission, status information, such as a consumable warning and a used amount report. Other notification types (not illustrated) may also be used.

FIG. 8 is a diagram illustrating an example of a sequence in the system according to the present exemplary embodiment. Initially, the MFP 1110 generates data of a notification event based on an event that has occurred therein, then in step 801, the MFP 1110 transmits the event to the server 1120. In step 802, the main control unit 303 acquires the account information for the users registered in the notification destination management unit 305 from the user information management unit 306. The account information also includes the security level for each user. In step 803, the main control unit 303 acquires a message corresponding to the security level for each piece of acquired account information from the event-to-message conversion unit 304. In step 804, the main control unit 303 transmits the acquired message to the mobile terminal 1130 of the corresponding account. In response to receiving the message, the mobile terminal 1130 controls the display of the operation display unit 138 and other units in step 805.

In a case where a plurality of mobile terminals 1130 are accessing the server 1120, the server 1120 repeatedly performs the operations in steps 802 to 804 to transmit messages corresponding to the respective security level of the respective mobile terminals 1130, to all of the mobile terminals 1130.

Figure 9:
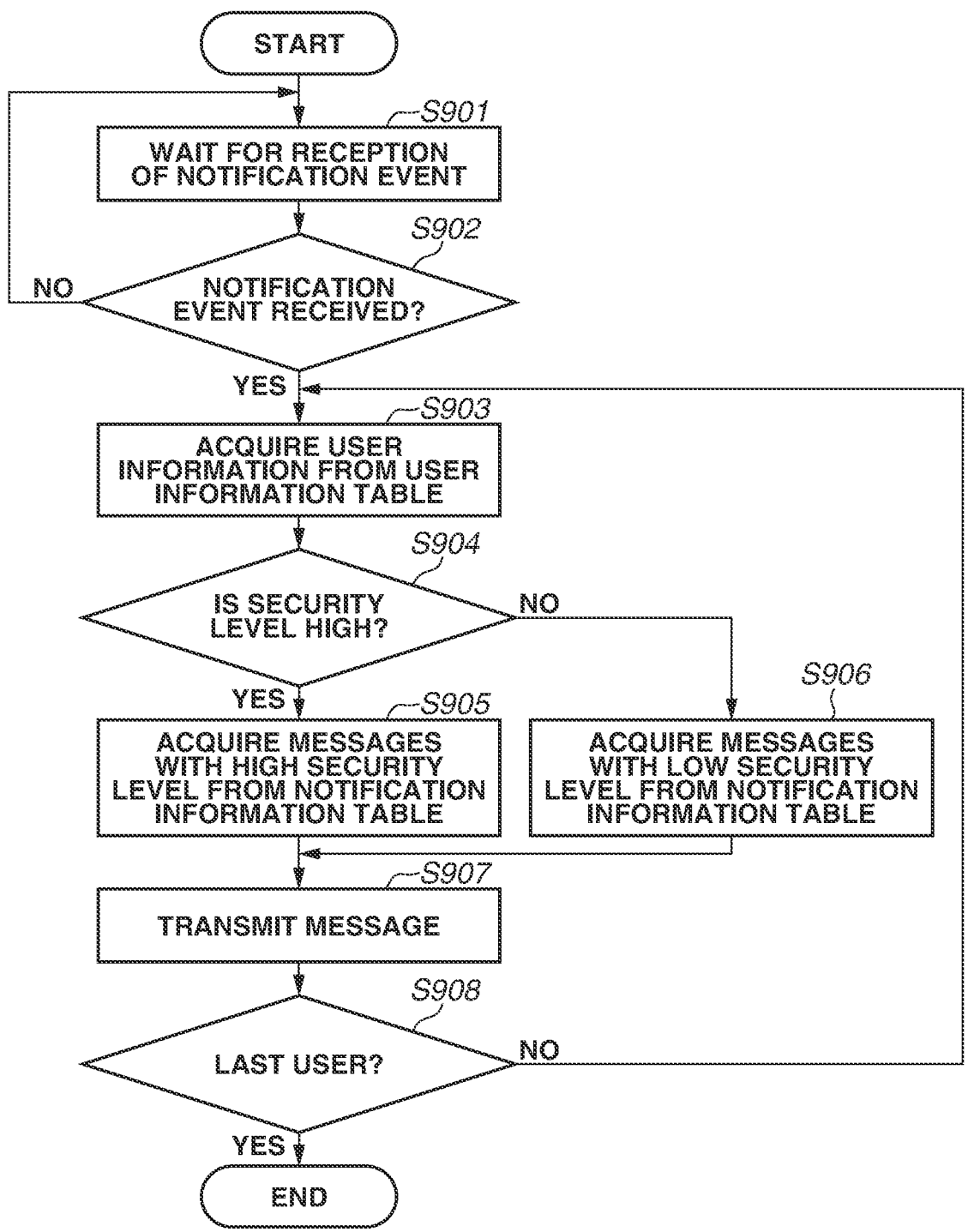
FIG. 9 is a flowchart illustrating processing which is performed by the server according to the present exemplary embodiment.

FIG. 9 is a flowchart illustrating message transmission processing which is performed by the server 1120 according to the present exemplary embodiment.

In step S901, the MFP event reception unit 302 waits for a reception of an event notification request from an external server via a network. In step S902, the MFP event reception unit 302 determines whether a notification event is received from an external source, such as the server 1120. If the MFP event reception unit 302 determines that a notification event is not received (NO in step S902), the processing returns to step S901. If the MFP event reception unit 302 determines that a notification event is received (YES in step S902), the MFP event reception unit 302 transfers the received notification event to the main control unit 303. The processing then proceeds to step S903. In step S903, the main control unit 303 acquires the account information for the user, registered in the notification destination management unit 305 from the user information management unit 306. In step S904, the main control unit 303 determines whether the security level of the acquired user information is "high". If the main control unit 303 determines that the security level is "high" (YES in step S904), the processing proceeds to step S905. In step S905, the main control unit 303 acquires the messages corresponding to the high security level registered in the notification information table 701 from the event-to-message conversion unit 304. This enables users using the server 1120 with the high security level to be notified of all of necessary information.

If the main control unit 303 determines that the security level is not "high" (NO in step S904), the processing proceeds to step S906. In step S906, the main control unit 303 acquires messages corresponding to the low security level registered in the notification information table 701 from the event-to-message conversion unit 304. This enables users using the server 1120 with the non-high security level to be notified of only information that are allowed to be notified to those users.

In step S907, the main control unit 303 transmits a message to the mobile terminal 1130 of the corresponding account. The message is transmitted to the mobile terminal message transmission unit 309 and then to the mobile terminal 1130 via the network communication unit 301. In step S908, the main control unit 303 determines whether the account having been processed corresponds to the last user in a user information table. If the main control unit 303 determines that the account does not correspond to the last user (NO in step S908), the processing returns to step S903. If the main control unit 303 determines that the account corresponds to the last user (YES in step S908), the processing is ended.

Figure 10:
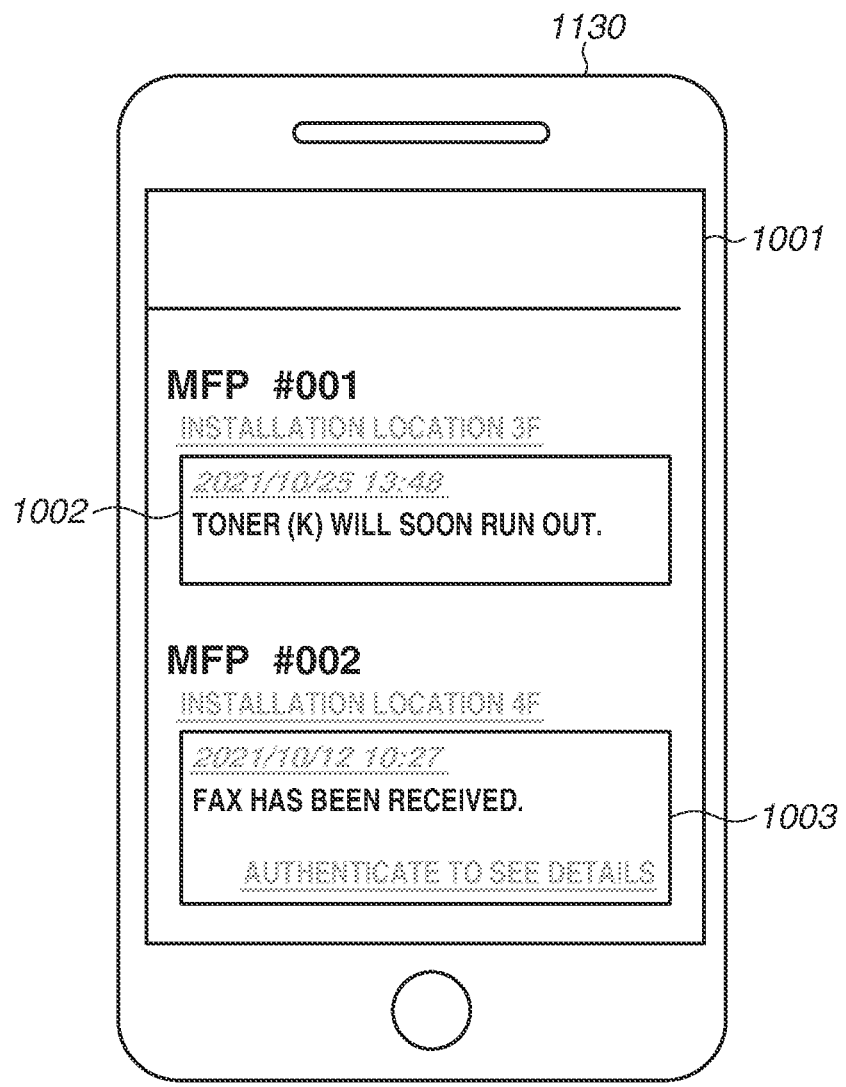
FIG. 10 is an explanatory diagram illustrating an example of a user interface (UI) screen of the mobile terminal according to the present exemplary embodiment.

FIG. 10 is an explanatory diagram illustrating a user interface (UI) screen of the mobile terminal 1130 according to the present exemplary embodiment. The screen of the mobile terminal 1130 displays a message display portion 1001. The message display portion 1001 displays received messages (messages 1002 and 1003).

The message 1002 is an example of a notification for the same message regardless of the security level. The message 1003 is an example of a notification for a different message according to the security level. FIG. 10 illustrates an example of displayed messages with the "low" security level. In a case where a message with the "low" security level is displayed, the message is supplied with an additional message indicating that authentication enables access to details. FIG. 10 illustrates an example of such an additional message (object) "Authenticate to See Details". This object allows the user to recognize that some of messages are not currently displayed because of the low security level. The UI may be configured such that tapping the message "Authenticate to See Details" displays an authentication screen.

Figure 12A:
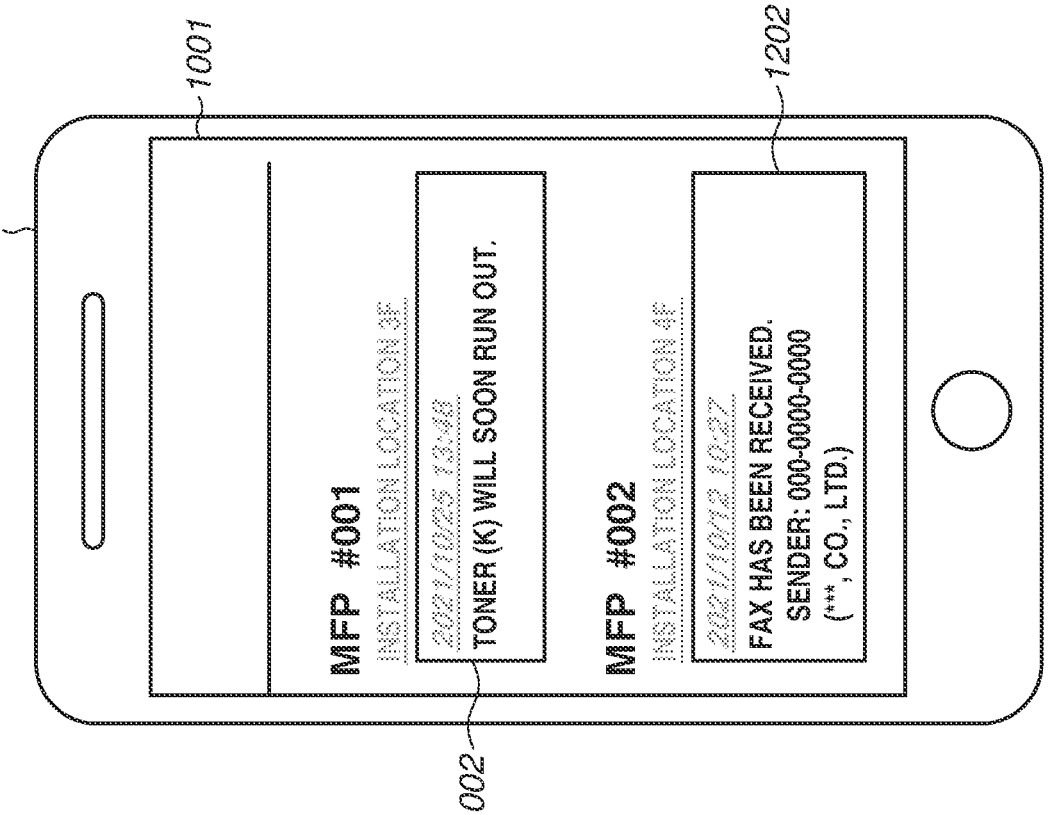
FIGS. 12A and 12B are explanatory diagrams each illustrating examples of UI screens of the mobile terminal in the message reacquisition processing according to the present exemplary embodiment.
Figure 12B:
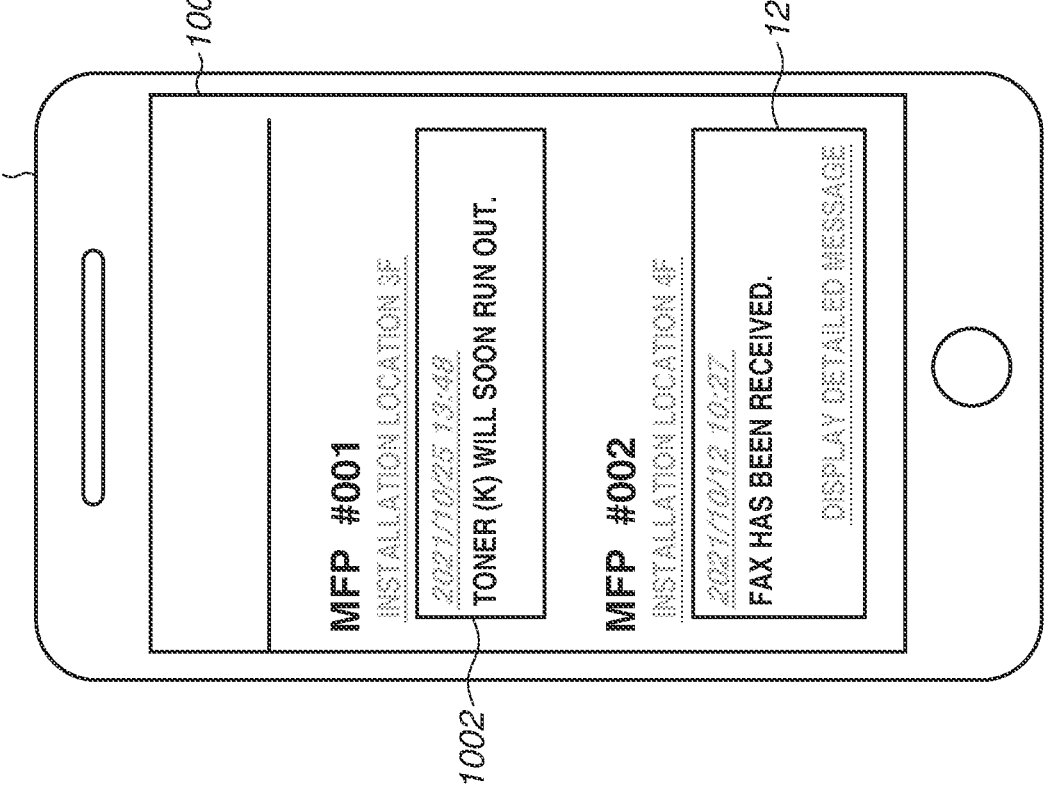

FIG. 11 is a flowchart illustrating processing which is performed by the server 1120 in a case where the mobile terminal 1130 receives a message with the low security level and then acquires a message again with the high security level. FIGS. 12A and 12B illustrate UI screens of the mobile terminal 1130 in this case.

FIG. 12A is an explanatory diagram illustrates a UI screen in a state where the mobile terminal 1130 receives a message with the low security level and then performs the authentication that satisfies a condition for the high security level. A message 1201 is received with the low security level and therefore corresponds to the low security level.

The message 1201 is provided with a detailed message request button. For example, such a button is an object configured with a message "Display Detailed Message". In response to the user tapping this button, the mobile terminal 1130 transmits a message for a request for a detailed message corresponding to the high security level to the server 1120. In step S1101, the mobile terminal message reception unit 308 waits for the reception of a message for a request for a detailed message from the mobile terminal 1130 via a network.

In step S1102, the mobile terminal message reception unit 308 determines whether a message for a request for a detailed message is received from an outside source, such as the mobile terminal 1130. If the mobile terminal message reception unit 308 determines that the message is not received (NO in step S1102), the processing returns to step S1101. In step S1102, if the mobile terminal message reception unit 308 determines that the relevant message is received (YES in step S1102), the mobile terminal message reception unit 308 transfers the received notification event to the main control unit 303. The processing then proceeds to step S1103. In step S1103, the main control unit 303 acquires the account information for the transmission source of the received message via the user information management unit 306. In step S1104, the main control unit 303 determines whether the security level of the acquired user information is "high".

If the main control unit 303 determines that the security level is "high" (YES in step S1104), the processing proceeds to step S1105. In step S1105, the main control unit 303 acquires the message corresponding to the high security level registered in the notification information table 701 from the event-to-message conversion unit 304. If the main control unit 303 determines that the security level is not "high" (NO in step S1104), the processing proceeds to step S1106. In step S1106, the main control unit 303 generates an error message because the condition for the detail message transmission is not satisfied. In step S1107, the main control unit 303 transmits the message to the mobile terminal 1130 of the corresponding account. The message is transmitted to the mobile terminal message transmission unit 309 and then to the mobile terminal 1130 via the network communication unit 301.

FIG. 12B illustrates a state after the reception of the detailed message. A new message 1202 is displayed on the portion where the message 1201 has been displayed. The message 1202 is the detailed message transmitted from the server 1120 in the case of the high security level. For a message received with the low security level, performing the authentication afterward enables the user to receive a detailed message corresponding to the high security level.

While a description has been provided in the present exemplary embodiment of a case where the security level is set to two steps, the security level may be set, for example, to three or more steps.

The information processing system according to the present disclosure makes it possible to issue only a suitable notification by changing the notification according to the connection environment of a mobile terminal and the login situation of a user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-079197, filed May 13, 2022, which is hereby incorporated by reference herein in its entirety.

What is claimed is:

1. An information processing system, comprising:
    an image processing apparatus configured to receive image data from an external apparatus;
        a mobile terminal configured to accept first authentication information to be used in a first authentication method and second authentication information to be used in a second authentication method different from the first authentication method, the second authentication method being a two-step authentication; and
        a server communicable with the mobile terminal, comprising:
            a network interface that receives, from the mobile terminal, information indicating an authentication state, for a user of the mobile terminal, in the information processing system and information indicating a place of the mobile terminal, the place being specified by an IP address of the mobile terminal; and
        a controller that notifies the mobile terminal of information;
        wherein the controller determines, based on the information indicating the authentication state and the information indicating the place of the mobile terminal, whether the controller notifies the mobile terminal of first information without second information or the controller notifies the mobile terminal of the first information and the second information, the second information being transmission source information of the image data, and the first information being information indicating that the image processing apparatus has received the image data,
        wherein the controller determines that the controller notifies the mobile terminal of the first information without the second information in a case where the network interface receives, from the mobile terminal, information indicating that the place of the mobile terminal is an individual home and information indicating that the authentication state, for the user of the mobile terminal, in the information processing system is a state of successful authentication with the first authentication method,
        wherein the controller determines that the controller notifies the mobile terminal of the first information and the second information in a case where the network interface receives, from the mobile terminal, information indicating that the place of the mobile terminal is an office and information indicating that the authentication state, for the user of the mobile terminal, in the information processing system is the state of successful authentication with the first authentication method, and
        wherein the controller determines that the controller notifies the mobile terminal of the first information and the second information in a case where the network interface receives, from the mobile terminal, information indicating that the place of the mobile terminal is the individual home and information indicating that the authentication state, for the user of the mobile terminal, in the information processing system is a state of successful authentication with the second authentication method,
        wherein the first authentication information is information about an element and the second authentication information is information about another element.

2. The information processing system according to claim 1, wherein the information indicating the place of the mobile terminal includes positional information for the mobile terminal.

3. The information processing system according to claim 1, wherein the individual home is an environment for connecting to an external network.

4. The information processing system according to claim 1,
    wherein the server and the mobile terminal are communicable via an application program, and
    wherein at least the first authentication method is performed using the application program.

5. The information processing system according to claim 4, wherein, in a case where the mobile terminal using the application program in the individual home further performs authentication with the second authentication method after being notified only of first event information, the controller further notifies the mobile terminal of second event information.

6. A method for controlling an information processing system in which a server, a mobile terminal and an image processing apparatus are communicable, the method comprising:
    causing the image processing apparatus to receive image data from an eternal apparatus;
    causing the mobile terminal to accept first authentication information to be used in a first authentication method;
    causing the mobile terminal to accept second authentication information to be used in a second authentication method different from the first authentication method, the second authentication method being a two-step authentication;
    causing the server to receive, from the mobile terminal, information indicating an authentication state, for a user of the mobile terminal, in the information processing system and information indicating a place of the mobile terminal, the place being specified by an IP address of the mobile terminal;
    causing the server to notify the mobile terminal of information; and
    causing the server to determine, based on the information indicating the authentication state and the information indicating the place of the mobile terminal, whether the server notifies the mobile terminal of first information without second information or the server notifies the mobile terminal of the first information and the second information, the second information being transmission source information of the image data, and the first information being information indicating that the image processing apparatus has received the image data,
    wherein the server determines that the server notifies the mobile terminal of the first information without the second information in a case where the server receives, from the mobile terminal, information indicating that the place of the mobile terminal is an individual home and information indicating that the authentication state, for the user of the mobile terminal, in the information processing system is a state of successful authentication with the first authentication method, wherein the server determines that the server notifies the mobile terminal of the first information and the second information in a case where the server receives, from the mobile terminal, information indicating that the place of the mobile terminal is an office and information indicating that the authentication state, from the user of the mobile terminal, in the information processing system is the state of successful authentication with the first authentication method, and wherein the server determines that the server notifies the mobile terminal of the first information and the second information in a case where the server receives, from the mobile terminal, information indicating that the place of the mobile terminal is the individual home and information indicating that the authentication state, for the user of the mobile terminal, in the information processing system is a state of successful authentication with the second authentication method, and wherein the first authentication information is information about an element and the second authentication information is information about another element.

\* \* \* \* \*